United States Patent
Dominiak et al.

(10) Patent No.: US 10,668,415 B2
(45) Date of Patent: Jun. 2, 2020

(54) FILTER METHOD FOR FILTERING A FLUID AND ADJUSTING A PRE-TREATMENT AGENT BASED ON A PROCESS VARIABLE

(71) Applicant: GRUNDFOS HOLDING A/S, Bjerringbro (DK)

(72) Inventors: Dominik Dominiak, Lodz (PL); Rikke Eriksen Gissel, Aalborg (DK); Jacob Appelt Vibe Svendsen, Silkeborg (DK); Xing Zheng, Xi'an (CN); Jan Carøe Aarestrup, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 13 days.

(21) Appl. No.: 15/392,371

(22) Filed: Dec. 28, 2016

(65) Prior Publication Data
US 2017/0182439 A1   Jun. 29, 2017

(30) Foreign Application Priority Data
Dec. 29, 2015   (EP) .................................... 15202983

(51) Int. Cl.
| | | |
|---|---|---|
| C02F 1/00 | (2006.01) | |
| C02F 3/00 | (2006.01) | |
| B01D 37/04 | (2006.01) | |
| B01D 65/02 | (2006.01) | |
| B01D 61/16 | (2006.01) | |
| B01D 29/66 | (2006.01) | |
| B01D 37/03 | (2006.01) | |
| A61M 1/16 | (2006.01) | |
| B01D 17/02 | (2006.01) | |

(52) U.S. Cl.
CPC ........... B01D 37/043 (2013.01); B01D 29/66 (2013.01); B01D 37/03 (2013.01); B01D 61/16 (2013.01); B01D 65/02 (2013.01); B01D 2311/04 (2013.01); B01D 2311/2642 (2013.01); B01D 2321/04 (2013.01); B01D 2321/20 (2013.01)

(58) Field of Classification Search
USPC ................................ 204/405, 519, 541, 628
See application file for complete search history.

(56) References Cited

U.S. PATENT DOCUMENTS

| | | |
|---|---|---|
| 2008/0314833 A1 | 12/2008 | Mosqueda-Jimenez et al. |
| 2009/0308745 A1 | 12/2009 | McLeod |

(Continued)

FOREIGN PATENT DOCUMENTS

| | | |
|---|---|---|
| CN | 1721050 A | 1/2006 |
| KR | 100949658 B1 | 3/2010 |

OTHER PUBLICATIONS

Written Opinion dated Sep. 12, 2019, from the Intellectual Property Office of Singapore (IPOS). (Year: 2019).*

*Primary Examiner* — Hayden Brewster
(74) *Attorney, Agent, or Firm* — McGlew and Tuttle, P.C.

(57) ABSTRACT a filtering method, with which a fluid to be filtered is led through a filter (4), the filter (4) is back-flushed at regular time intervals and a pre-treatment agent is added to the fluid at the entry side of the filter. A process variable which describes the efficiency of the filtration is continuously computed during the filtration, and a metering quantity of the pre-treatment agent is reset on the basis of the values for the process variable or a characteristic values derived from this.

18 Claims, 5 Drawing Sheets

(56) References Cited

U.S. PATENT DOCUMENTS

2010/0032373 A1    2/2010   Langlais
2010/0282679 A1   11/2010   Langlais
2013/0056412 A1    3/2013   Chang et al.

* cited by examiner

FILTER METHOD FOR FILTERING A FLUID AND ADJUSTING A PRE-TREATMENT AGENT BASED ON A PROCESS VARIABLE

CROSS REFERENCE TO RELATED APPLICATIONS

This application claims the benefit of priority under 35 U.S.C. § 119 of European Application 15 202 983.1 filed Dec. 29, 2015, the entire contents of which are incorporated herein by reference.

FIELD OF THE INVENTION

The invention relates to a filtering method for filtering a fluid and to a filter device for filtering a fluid.

BACKGROUND OF THE INVENTION

Normally, filter residues settle at the entry side of the filter applied for filtration, when filtering fluids and these residues thus continuously reduce the filtering capability of the filter. Inasmuch as this is concerned, it is necessary to free the applied filter from filter residues at certain intervals, in particular during a filtering process continuing for a longer period of time. For this purpose, the filters are usually back-flushed with fluid. This back-flushing typically reduces the efficiency of the filtering process, which is particularly the case if a part of the permeate which is produced with the filtration is used for back-flushing the filter.

It is known to admix special pre-treatment agents to the fluid to be filtered, at the entry side of the filter, in order to be able to simplify the release of deposits adhering to the filter when back-flushing, wherein these pre-treatment agents in the fluid effect a precipitation of substances dissolved in the fluid and/or a flocculation of colloidal constituents of the fluid which is to say reduce the binding of the filter residues on the filter.

Different procedural manners are common for metering such pre-treatment agents. A known method lies in admixing a constant flow of pre-treatment agent to the fluid to be filtered. With another known method, the pre-treatment agent is added to the fluid to be filtered such that the concentration of this agent in the fluid to be filtered is kept constant during the complete filtering process. Both methods however have the disadvantage that they have been found to be ineffective if the degree of contamination of the fluid to be filtered changes during the filtration process.

A further approach for metering the pre-treatment agent lies in providing a type of closed control loop and detecting parameters relating to the quality of the fluid to be filtered, by way of sensors. This procedural manner, although representing a certain improvement compared to the provision of a constant quantity or concentration of the pre-treatment agent, however this measure too has been found to be ineffective, since the constraints before and on filtration as a whole cannot be acquired in their entirety by this measure.

SUMMARY OF THE INVENTION

Against this background, it is the object of the invention, to provide a filtering method and a filter device for filtering a fluid, with which a significantly more efficient filtering process can be realized.

The part of this object with regard to the method is achieved by a filtering method according to the invention, whereas a filter device with the features according to the invention solves the part of this object with regard to the device.

With regard to the filtering method according to the invention, which for example can serve for recycling or reprocessing waste-water or for treating drinking water, a membrane filter is preferably used as a filter. The fluid to be filtered is led to and through the filter preferably by way of at least one pump. Hereby, a rule, filter residues are held back at the entry side of the filter and these at least partly adhere to the entry side of the filter. The filter is back-flushed at predetermined intervals with a fluid and preferably with a part of the permeate produced on filtration, in order to remove at least a predominant part of these filter residues from the filter. With respect to intervals at which the filter is back-flushed it has to be remarked that these intervals may be regular time intervals or may be predetermined by a maximum differential pressure across the filter. Moreover, a pre-treatment agent is led to the fluid to be filtered, at the entry side of the filter, preferably via a metering pump. Agents which at the entry side of the filter effect a precipitation or flocculation of substances contained in the fluid and/or which above all prevent a binding of the filter residues on the entry side of the filter can be applied as pre-treatment agents.

The filtering method according to the invention, in comparison to filtering methods for the filtration of fluids which have been known until now, is characterized by a new type of metering of the pre-treatment means, which effects a significant increase of the efficiency of the filtering process. In this context, what is essential to the invention is the fact that a process variable describing the efficiency of the filtration is computed in a continuous manner during the filtration, and a metering quantity of the pre-treatment agent is newly adjusted in predefined intervals, on the basis of the values for the process variable or a characteristic value which is derived therefrom. Hereby, basically any process variable which changes during the filtering process and reflects the filtration capability of the complete filter device used for filtration of the fluid, said capability changing during the filtering process, and which behaves essentially proportionally to the deposition or sedimentation degree at the entry side of the filter, can be used as a process variable. Inasmuch as this is concerned, the values of the process variable or of a characteristic value derived from this and which are computed during the filtering process continuously provide information as to how successfully a certain metering quantity of pre-treatment agent in combination with the back-flushing of the filter affects the filtration process as a whole. Inasmuch as this is concerned, with the knowledge of the process variable, it is possible to adapt the metering quantity of pre-treatment agent to the development of process variable or of the characteristic value derived therefrom, in defined intervals, and to set the metering quantity in a manner such that an optimal as possible efficiency of the filtering process results.

The computation of the process variable describing the efficiency of the filtering process and which is carried out continuously during the complete filtering process, according to the invention is preferably effected in manner such that the filtration process is divided in to several consecutive filtering cycles which each begin with a back-flushing of the filter and end before the beginning of the next back-flushing, and a stored process variable is stored for each filtering cycle at a predetermined time of the filtering cycle. I.e., a stored value for the process variable and which results from several computations of the process variable continuously carried out during the filtering cycle and which reflects the magnitude of the process valuable at the end of the filtering cycle, thus directly before the back-flushing of the subsequent cycle, is computed for each filtering cycle. A trend which provides information as to how successful the supply of the pre-treatment agent affected to efficiency of the filtering process can be derived from these stored end-values of the process variable of several consecutive filtering cycles.

The new setting of the metering quantity of the pre-treatment agent is preferably effected in metering steps which each comprise a certain number of filtering cycles. Accordingly, with regard to the metering steps, in which the metering quantity of the pre-treatment agent is newly adjusted in each case, it is the case of consecutive intervals which each contain one or more filtering cycles. The number of filtering cycles per metering step can hereby be generally selected in dependence on the constraints of the filtration process, but hereby it has been found that three filtering cycles per metering step represent a suitable value for a multitude of cases.

As has already been noted, generally any process variable, which reflects the filtration capability of the filter device during the filtering process and which behaves proportionally to the deposition extent on the filter, can be used as a process variable for resetting the metering quality of the pre-treatment agent. A pressure difference at the filter, i.e. the difference between an entry pressure and an exit pressure at the filter is mentioned as an example for a process variable which is basically suitable with regard to this. This pressure difference continuously increases with an increasing deposition degree on the filter. However, this differential pressure is subjected to certain micro-fluctuations during the filtering cycle, which renders it comparatively cumbersome to compute a meaningful end-value for the differential pressure for each filtering cycle. For this reason, it is actually more favorable to use such a process variable which is not subjected to such micro-fluctuations over the filtering cycle, as a process variable for resetting the metering quantity of the pre-treatment agent. Such a process variable is the relative energy consumption which arises per filtering cycle and which also changes proportionally to the filtration capability of the filter, i.e. increases with increasing deposits on the entry side of the filter, and also take into account changes of the contamination degree of the fluid to be filtered. For this reason, according to the invention, one envisages the process variable being a relative energy consumption per filtering cycle, which is computed by way of dividing a total energy consumption per filtering cycle by a net permeate volume produced per filtering cycle.

The consumption of pre-treatment means, apart from the energy consumption, also influences the efficiency of the filtration process, at least with regard to the arising costs. With the preferred application of the relative energy consumption per cycle as a process variable, it is therefore useful to also permit the pre-treatment agent consumption occurring per filtering cycle to be included in this value. This is usefully effected via the total energy consumption per filtering cycle. Inasmuch as this is concerned, according to the invention, one preferably envisages the complete energy consumption per filtering cycle being the sum of the energy which is necessary per filtering cycle for the filtering, the back-flushing and the metering of the pre-treatment agent as well as of an energy value representing an equivalent to the pre-treatment agent consumption. The computation of the total energy consumption per cycle is accordingly effected in a manner such that per filter cycle, the energy requirement for the filtration, i.e. the energy requirement of the pump or pumps used for the delivering the fluid to and through the filter, and the energy requirement for the back-flushing, i.e. to the energy requirement of a pump used for delivering the back-flushing fluid, and the energy requirement for metering the pre-treatment means, i.e. the energy requirement of a metering pump used for metering, as well as the energy value representing an equivalent to the pre-treatment agent consumption, are added. The last-mentioned energy value results in a comparatively simple manner by way the costs for the consumed pre-treatment agent being equated with corresponding energy costs, wherein a corresponding energy value can be computed given known energy prices.

The net permeate volume which is used as a divider for computing the relative energy consumption per filtering cycle preferably corresponds to the permeate volume which is produced per filtering cycle, minus the permeate volume which is used per filtering cycle for back-flushing the filter. One therefore takes into account the fact that a part of the produced permeate which is then no longer available for the actual use of the permeate, is necessary for the back-flushing. Thereby, the absolute, produced permeate volume is summed per filtering cycle and the permeate volume which is used at the beginning of the filtering cycle for back-flushing is deducted from this, so that ideally the net permeate volume which is produced up to this point in time can be determined at any point in time and be used of the continuous computation of the relative energy consumption per filtering cycle.

According to a further preferred development of the filtering method according to the invention, the stored process variable is stored at the end of the filtering cycle, and a function curve of the two or more stored process variables is determined from these values. Hereby, a gradient value of this function curve is determined for each metering step. This procedural manner is advantageous inasmuch as the gradient values of the determined function curve contain particularly useful information with regard to the effectiveness of a previously set quantity of pre-treatment agent. Thus an increase of the gradient value compared to the gradient value of the preceding metering step indicates a worsening of the efficiency of the filtration, whereas a gradient value which reduces compared to the gradient value of the preceding metering step indicates an improved efficiency of the filtration. In the most favorable case, the gradient value is negative, which is an indication for an optimal efficiency of the filtration and an optimally set quantity of pre-treatment agent.

With regard to the setting of the metering quantity of the pre-treatment agent, the filtering process is preferably divided into at least two general phases. In this context, one advantageously envisages a coarse setting of the metering quantity being carried out in a first phase, and the metering quantity, departing from a metering quantity determined with the coarse setting, being optimized in a fine setting in a second phase of the filtering process. With the coarse setting, one seeks to approximate the metering quantity to a metering quantity which is optimal with regard to the efficiency of the filtration, in as few as possible metering steps, thus as rapidly as possible. Hereby, the changes of the metering quantity are relatively large. The metering quantity which is determined with the coarse setting then forms the starting value with the fine metering, in which the metering quantity, usefully with smaller changes of the metering quantity than with the coarse setting, can be approximated even more to the optimal metering quantity and in the further procedure is held at such values which entail an as large as possible efficiency of the filtration.

Within the framework of the coarse setting, one preferably envisages the metering quantity being increased by the same amount in consecutive metering steps, as long as the stored process variable changes in the same direction to a value representing an optimal process condition of the filtration process, wherein the coarse setting is completed when the stored process variable moves away from the value representing the optimal process condition, in the opposite direction. Hereby, the coarse setting preferably starts with a step, with which no pre-treatment agent is admixed to the fluid to be filtered, thus with a metering quantity=0. A gradient value of the function curve, in which curve the values for the stored relative energy consumption which are computed during the metering step are represented, is determined for this metering step. A defined metering quantity of pre-treatment agent is admixed to the fluid to be filtered, in a metering step which is directly subsequent to this, and the gradient value for this second metering step is computed. If the gradient value has reduced from the first metering step to the second metering step, then the metering quantity in further metering steps is increased in each case by the same amount as from the first to the second metering step, until the gradient value increases. This increase of the gradient value is an indication that a comparatively optimal metering quantity has reached a value lying between the metering quantities of the two last metering steps. Thus a metering quantity which lies between the metering quantities of the two last metering steps can be selected as a starting point of the fine setting.

With the fine setting of the metering, the metering quantity is advantageously newly set in each case in consecutive metering steps, wherein it changes is or is retained, in dependence on the development of the gradient value. The length of the metering steps with the fine setting is usefully the same as the length with the coarse setting of the metering and thus preferably also has three filtering cycles. In the metering steps, the metering quantity is either increased or reduced, depending on with which change of the metering quantity, a change of the gradient value in the direction of a value representing an optimal process condition of the filtering process is to be expected. If the gradient value reaches this value representing an optimal process condition of the filtering process, then the metering quantity is usefully retained, i.e. is not changed. Differently to the coarse setting of the metering of the pre-treatment agent, the metering quantity with the metering steps of the fine setting is usefully changed in a variable manner, wherein the amount by which the metering quantity is changed, is determined on the basis of the tendency of the gradient values of the function curve for the relative energy consumption in the directly preceding metering steps. For this, the gradient values of the function curve for the relative energy consumption of the individual metering steps are usefully stored in a FIFO buffer (first-in first-out buffer). The magnitude of the metering quantity of a metering step which then follows is then changed on the basis of the tendency (reducing or increasing) of the stored gradient values of the preceding metering steps, preferably by way of a computation algorithm which is specially provided for this. Hereby, the process dynamics are taken into consideration to the extent that the next metering quantity is reduced in a case, in which the gradient values in the preceding metering steps fluctuate by a defined amount, i.e. below and above a defined value. The next metering quantity is increased given a development in the preceding metering steps, with which the gradient values continuously increase or continuously reduce. It has been found that this procedural manner is particularly suitable for compensating quality changes of the fluid to be filtered, i.e. a changing burdening with solid matter, which is to say contamination of the fluid to be filtered.

Serious changes of the process conditions during the filtration, such as for example a significant change of the solid matter contamination of the fluid to be filtered can lead to an abrupt change of the process variable forming the basis for the setting of the metering quantity. If such an abrupt change of the process variable occurs in the phase of the fine setting of the metering quantity, one advantageously envisages ending the fine setting of the metering quantity and carrying out a renewed coarse setting of the metering quantity. The aim of this measure lies in again reaching a metering quantity of the pre-treatment agent which is optimized with regard to the changed process conditions, as rapidly a possible.

According to a further advantageous development of the filtering method according to the invention, the pre-treatment agent is added to the fluid to be filtered with a delay after a back-flushing of the filter. Accordingly, the filter is preferably firstly subjected to onflow by the fluid which does not yet contain pre-treatment agent, preferably directly after its back-flushing, and only after a certain interval comes into contact with the fluid containing the pre-treatment agent. This measure is based on the recognition that pre-treatment agents as a rule cling more strongly to the filter than solid matter contained in the fluid to be filtered. Inasmuch as this is concerned, it is more advantageous of only this solid master firstly settles on the filter, and the pre-treatment agent only subsequent to this, since the filter on back-flushing can be freed from all deposits more easily in this manner, when back-flushing the filter.

Preferably the start and the stop of the filtering cycle are determined by monitoring the continuously computed process variable or by monitoring a process value measured in the filter device. This proceeding is based on the fact that in case the filtering cycle stops or starts, a process value like the power consumption of a feed pump or the differential pressure across the filter will change rapidly. This rapid change preferably is used as an indication of a start or stop of the filtering cycle, wherein a rapid decreasing of the process variable and/or of the measured process value indicates an end of a filtering cycle and a rapid increasing of the process variable and/or of the measured process value indicates the start of a filtering cycle.

Apart from the filtering method which has been described beforehand, a filter device designed for carrying out the filtering method also belongs to the subject matter of the invention. This filter device for filtering a fluid comprises at least one filter, through which a fluid is led, wherein the fluid is freed from solid matter which is contained in the fluid to be filtered, by way of the filter. With regard to the filter, it is preferably the case of a membrane filter. The filter device is provided with at least one pump, for delivering the fluid to and through the filter. The filter device moreover comprises a metering pump. This metering pump which is typically designed as a displacement pump, in the known manner comprises a metering space with a displacement body which is adjacent this space or is arranged in it. The displacement body is movable by way of a displacement drive, i.e. a drive motor. The metering pump serves for the admixture of a pre-treatment agent to the fluid at the onflow side of the filter. The filter device comprises a control, for the control of this metering pump, i.e. for the control of its release of pre-treatment agent in to the fluid to be filtered, which is to say for the control of its displacement drive. This control is preferably an electronic control. According to the invention, the control is designed in a manner such that during the filtration, is continuously computes a process variable which describes the efficiency of the filtration and controls the metering pump on the basis of the values for the process variable or of a characteristic value which is derived from this. As has already been described by way of the filtering method according to the invention, this design of the control has the effect that the filter device according to the invention permits a significant increase of the efficiency of the filtering process compared to known filter devices of the type being discussed here.

With regard to the control, it can be the case of a separate control device which is signal-connected to the metering pump, but under certain circumstances is arranged spatially separated from the metering pump. According to the invention, one however preferably envisages the control being an integral part of the metering pump. The control is thus preferably arranged in or directly on a casing of the metering pump.

The invention is hereinafter explained in more detail by way of one embodiment example which is represented in the drawing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
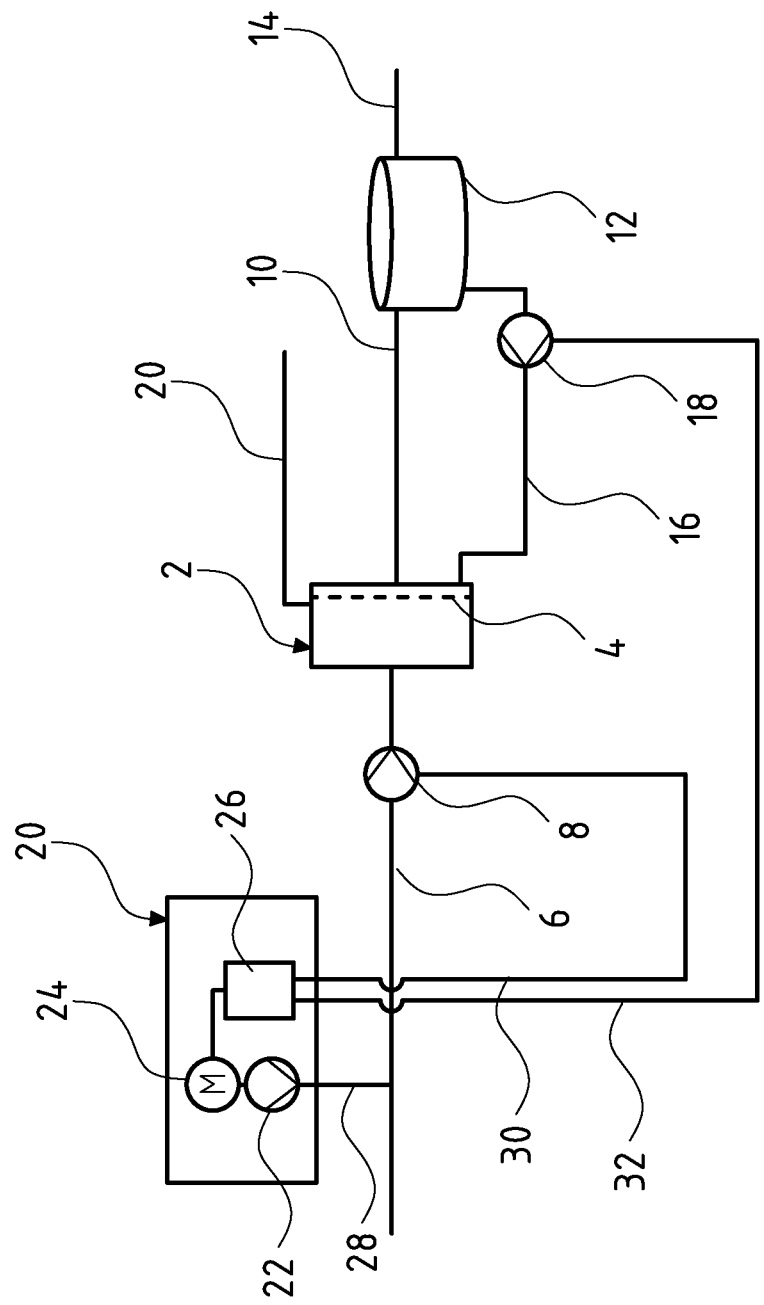
FIG. 1 is a filter device in a schematically, greatly simplified basic sketch.

Referring to the drawings, the filter device which is represented in FIG. 1 comprises a filter unit 2, which is designed with a filter 4 in the form of a membrane filter. A conduit 6 runs out at the filter unit 2 at the entry side. A fluid to be filtered is led to the filter unit 2 via this conduit 6. Hereby, the fluid to be filtered is delivered to the filter unit 2 and there through the filter 4, by way of a pump 8. A conduit 10 connects to the filter unit 2 at the exit side of this. The filtered fluid, i.e. the permeate which is produced on filtration, gets via this conduit 10 into a collection tank 12. An exit conduit 14, via which the produced permeate is led to an end consumer or to its final purpose, is formed in the collection tank 12.

Solid matter which is contained in the fluid to be filtered settles at the entry side of the filter 4, during the filtration process. These deposits continuously reduce the filtration capability of the filter 4 during the filtration process. For this reason, the filter 4 is freed from the deposits at predetermined intervals by way of back-flushing. For this purpose, a part of the permeate which is produced on filtration and which is stored in the collection tank 12, is led via a conduit 16 connected to the collection tank 12 as well as to the filter unit 2, into the filter unit 2 and there is led through the filter 4 from its exit side to its entry side. Hereby, a pump 18 which is arranged in the conduit 16 delivers the permeate which is used for back-flushing, from the collection tank 12 through the filter 4. The deposits (accumulations) at the entry side of the filter 4 are removed from the filter 4 as a result of the back-fleshing, and together with the permeate used for the back-flushing are removed from the filter unit 2 via an outlet 20 out of the filter unit 2.

A pre-treatment agent is admixed to the fluid to be filtered at the entry side of the filter unit 2, for improving the cleaning of the filter 4 with its back-flushing. A metering pump 20 which comprises a pump part 22, a drive 24 for the pump part 22 as well as a control 26, whose significance will yet be explained in more detail hereinafter, is used for this. The metering pump 20 at the onflow side of the pump 8 is connected to the conduit 6 via a conduit 28. The metering pump 20 receives a power measurement signal from the pumps 8 and 18. For this purpose the pump 8 is connected to the control 26 of the metering pump 20 via a signal line 30 whereas the pump 18 is connected to the control 26 of the metering pump 20 via a signal line 32. Furthermore, the signal lines 30 and 32 may transmit information with regard to the flow of the pumps 8 and 18 to the control 26, wherein this information may be provided by the pumps 8 and 18 or by external flow sensors which are not illustrated in FIG. 1.

The control 26 of the metering pump 20 is predominantly provided for the control or setting of the quantity of pre-treatment agent which is to be released by the metering pump 20. Hereby, the control 26 is designed in a manner such that the method steps described hereinafter are initiated by it.

A coarse setting A (FIG. 2) of the metering quantity of the pre-treatment agent which is released by the metering pump 20 is initiated by the control 26 by way of a control program provided for this purpose, at the beginning of a filtering process. The operating manner in this control program for coarse setting A corresponds to the flow diagram represented in FIG. 3 and is explained by way of FIGS. 2 and 3.

The control program for coarse setting A begins at a start ST1. A first magnitude for the metering quantity DM in a first metering step D1 is determined in a program step S1 which follows the start ST1. This metering step D1, as also all subsequent metering steps, comprises M filtering cycles, wherein the filtering cycles in each case begin with a back-flushing of the filter 4 and end directly before the next back-flushing of the filter 4. As is evident from FIG. 2, in which the metering quantities DM (right vertical axis) for the metering steps are represented as horizontal lines, the metering quantity DM for the first metering step D1 is zero.

An enquiry R1, in which it is verified as to whether a back-flushing of the filter 4 is already effected, is subsequent to the program step S1. The enquiry R1 is repeated if the result of this enquiry R1 is N (no). A program step S2 is carried out with a result Y (yes).

The relative energy consumption is continuously computed during the filtering cycle in the program step S2. This results by way of dividing a total energy consumption per filtering cycle by a net permeate volume which is produced per filtering cycle. Hereby, the energy consumption for filtering, thus the energy consumption of the pump 8, the energy consumption for back-flushing, thus the energy consumption of the pump 18, the energy consumption for metering the pre-treatment agent, thus the energy consumption of the metering pump 20 and an energy valve which represents an equivalent to the pre-treatment agent consumption are added to one another for determining the total energy consumption, and this total energy consumption is divided by the net permeate volume which is the difference between the absolutely produced permeate quantity and the permeate quantity used for back-flushing. This computation is carried out in a continuous manner during the complete filtering cycle, wherein it is examined in each case in an enquiry R2, as to whether the end of the filtering cycle is reached. The program step S2 is carried out new if the result of this enquiry is N (no). The program step S3 is effected with a result Y (yes) of the enquiry R2.

The values for the relative energy consumption and which are computed in a continuous manner during the filtering cycle are combined into an end-value for the relative energy consumption and this end-value is stored, in the program step S3. A program step S4 follows the program step S3. A counting variable for the filtering cycle is increased by a value of 1 in this program step S4. An enquiry R3 follows the program step S4. It is examined in this enquiry R3 as to whether the counting variable for the filtering cycle and which is increased in the program step S4 corresponds to the total number M of filtering cycles per metering step. If the result of this request is N (no), the previously described procedure begins again at the enquiry R1. The program step S5 is carried out if the result of the enquiry R3 is Y (yes).

A virtual function curve of the relative energy consumption and a gradient value of this function curve for the current metering step are determined from the stored values for the relative energy consumption of the M filtering cycles, in the program step S5. These gradient values form the basis of which the metering quantity DM of the pre-treatment agent is set.

An enquiry R4 is subsequent to the program step S5. In the enquiry R4, it is examined as to whether the gradient value or the process variable, which is determined in the program step S5, has a value smaller than zero. A program end PE1 is reached in the case of a result Y (yes) of this enquiry R4, which means that the momentary (current) metering quantity DM is an optimal metering quantity of the pre-treatment agent. A further enquiry is R5 carried out with a result N (no) of the enquiry R4.

In the enquiry R5, it is enquired as to whether the gradient value or process variable of the current metering step and which is determined in the program step S5 is larger than the gradient value of the preceding metering step. A program end PE2 is reached if the result of this enquiry R5 is Y (yes), and this means that the metering quantity of the preceding metering step is the optimal metering of the coarse setting. This is the case in FIG. 2 at the metering quantity DM3. A program step S6 is carried out if the result of the enquiry R5 is N (no).

A metering quantity DM of the pre-treatment agent is increased by a fixed amount in the program step S6. An enquiry R6 is subsequently carried out, in which it is examined as to whether the metering quantity after the program step S6 exceeds a maximal allowable value for the metering quantity DM. The program end PE2 is also reached with a result Y (yes) of this enquiry R6, which means that the metering quantity of the preceding metering step is the maximum metering of the coarse setting. The program course begins anew with the request R1 if the result of the enquiry R6 is N (no).

Figure 4:
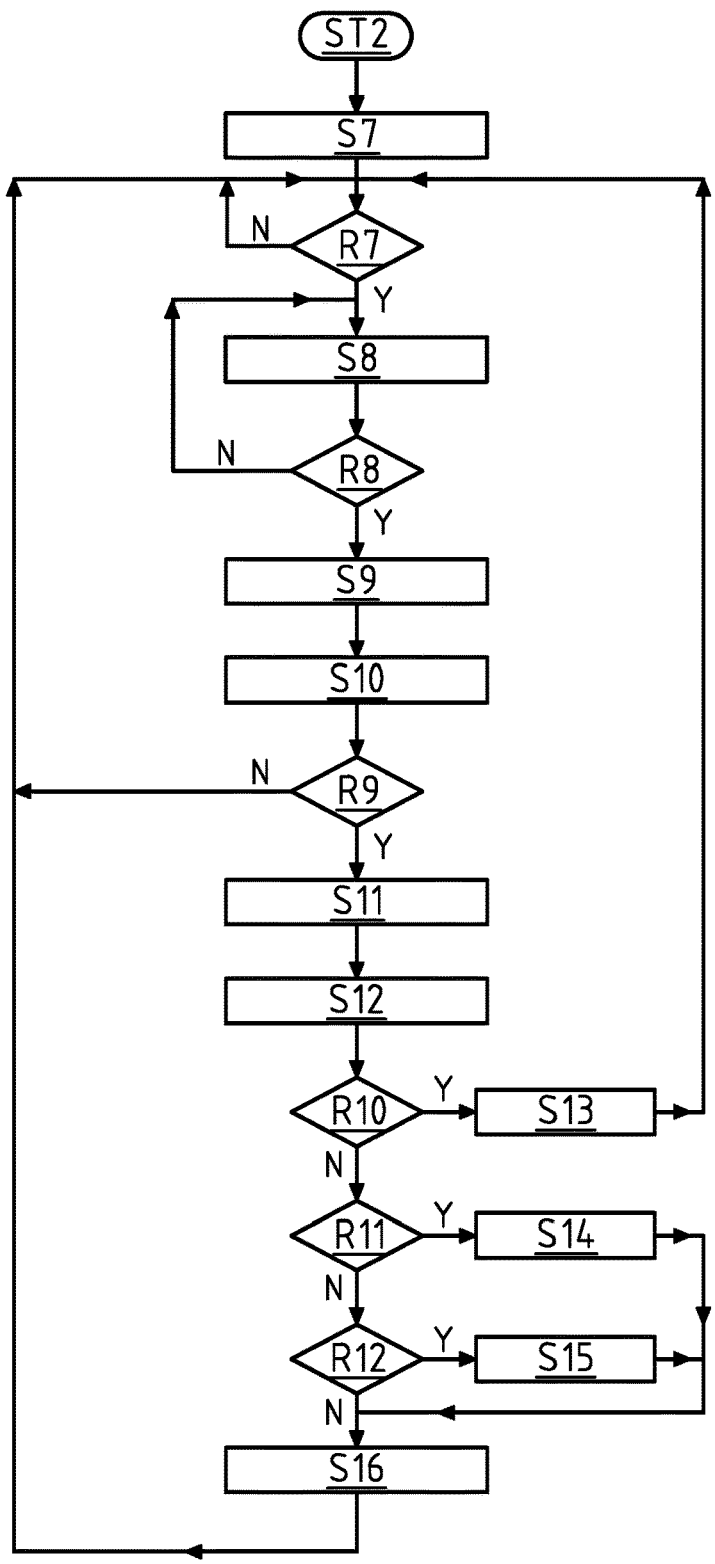
FIG. 4 is a flowchart for a fine setting of the metering quantity of the pre-treatment agent.

If one of the program ends PE1 or PE2 has been reached with the coarse setting A of the metering of the pre-treatment agent, then a program for the fine setting B of the metering quantity of the pre-treatment agent is called up in the control 26, which is explained hereinafter by way of FIGS. 2 and 4.

The control program for fine setting B begins at a start ST2. A first metering quantity DM5 (FIG. 2) which is seen as approximately optimal and is for a first metering step D5 (FIG. 2) of the fine setting B is set on the basis of the coarse setting A, in a program step S7 which is subsequent to the start ST2.

An enquiry R7 follows the program step S7. In the enquiry R7, it is enquired as to whether a back-flushing of the filter 4 is already effected. If the result of this enquiry R7 is N (no), then the enquiry R7 is repeated for so long, until the result of the enquiry R7 is Y (yes). The program step S8 is carried out given the result Y of the enquiry R7.

The relative energy consumption during the filtering cycle is computed in the program step S8. This procedural manner is hereby identical to that with the program step S2 of the coarse setting A. The computation of the relative energy consumption is effected continuously during the complete filtering cycle, wherein in an enquiry R8, it is questioned as to whether the end of the filtering cycle is reached. The program step S8 is carried out anew if the result of this enquiry R8 is N (no). A program step S9 follows the enquiry R8, and after this, a program step S10, in the case of a result Y (yes) of the enquiry R8.

The programs steps S9 and S10 are identical to the program steps S3 and S4 with the coarse setting A. Thus in the program step S9, the values for the relative energy consumption and which are continuously computed during the filtering cycle are combined into an end-value, and this end-value is stored, whilst a counting variable for the filtering cycle is increased by a value of 1 in the program step S10.

An enquiry R9, in which it is examined as to whether the counting variable for the filtering cycle and which is increased in the program step S10 corresponds to the total number M of the filtering cycles per metering step, follows programming step S10. With a result N (no) of this enquiry R9, the previously described procedure begins again with the enquiry R7, and the program step S8, the enquiry R8, the program steps S9 and S10 as well as the enquiry R9 follow this. The program step S11 is otherwise carried out, i.e. with a result Y (yes) of the enquiry R9.

The program step S11 corresponds to the program step S5 with the coarse setting A. Accordingly, a virtual function curve of the relative energy consumption is determined from the stored values for the relative energy consumption of the M filtering cycles, in the programs step S11, and a gradient value DIR is determined for the current metering step.

The directions of the gradient values (+ or −) which are determined in the program step S11 are led to a FIFO buffer (first-in first-out) buffer and are stored there, in the program step S12 which is subsequent to program step S11.

An enquiry R10 is subsequent to this. In the enquiry R10, it is enquired as to whether the gradient value DIR of the virtual function curve of the relative energy consumption for the current metering step and determined in the program step S11 is smaller than zero, thus negative. No change of the metering quantity DM is carried out and the program step S13 is implemented if the result of the enquiry R10 is Y (yes).

In the program step S13, a counter for the metering step is increased by the value 1 and the fine setting B begins again with the enquiry R7 for the next metering step, whereupon the program step S8, the enquiry R8, the program steps S9 and S10, the enquiry R9, the program steps S11 and S12 as well as the enquiry R10 then follow. The enquiry R11 is effected if the result of the enquiry R10 is N (no).

In the enquiry R11, it is enquired as to whether the gradient value DIR of the virtual function curve of the relative energy consumption for the preceding metering step and which is determined in the program step S11 was smaller than zero, thus negative. The program step S14, in which the value for the gradient value DIR is set to a value −1, thus DIR=−1, is carried out in the case of a result Y (yes) of this enquiry R11. The program step S16 is carried out subsequently to this.

A new metering quantity DM for the next metering step is ascertained in the program step S16 and the counter for the metering step is increased by the value 1. The fine setting B for the next metering step begins subsequently to this, again with the enquiry R7. The evaluation of the metering quantity DM in the program step S16 hereby results from the sum of the current metering quantity and from the product of the gradient value DIR and a metering quantity change value DMA which is determined in a program used in combination with the FIFO buffer. This is dealt with in more detail hereinafter. The fine setting B for the next metering step begins again with the enquiry R7, after implementing the program step S16.

In the case of a result N (no) of the enquiry R11, an enquiry R12 follows, in which it is enquired as to whether the gradient value DIR of the virtual function curve of the stored relative energy consumption for the current metering step and which is determined in the program step S11 is larger than the gradient value DIR of the preceding metering step. If the result of this enquiry is Y (yes), the program step S15, in which the polarity of the gradient value DIR is reversed, thus DIR=DIR*(−1), is carried out. The program step S16 is carried out subsequently to this. The program step S16 is carried out directly given a result N (no) of the enquiry R12.

Figure 5:
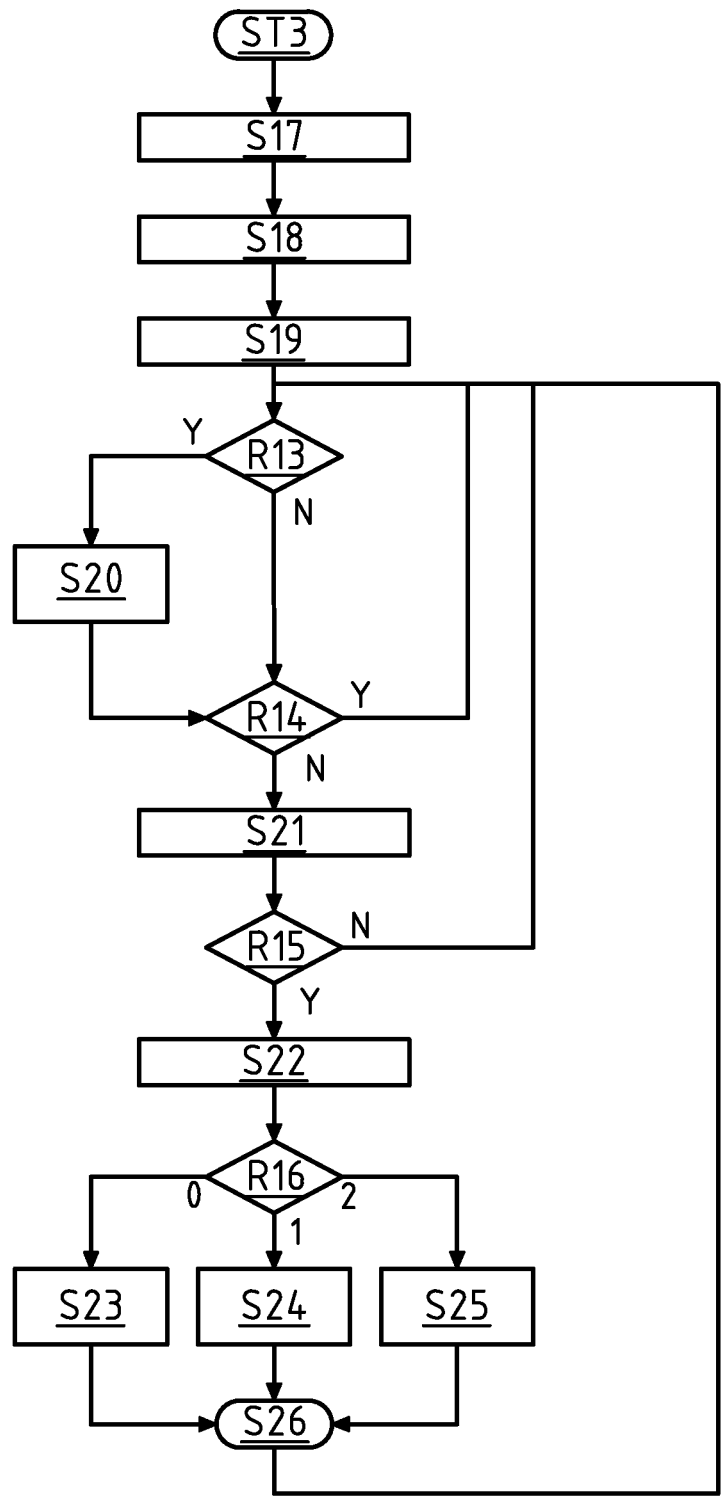
FIG. 5 is a flowchart for determining a change of the metering quantity of the pre-treatment agent during the fine setting.

The program course for determining the metering quantity change value DMA is to be deduced from FIG. 5. The program begins with a start ST3. A program steps S17 follows the start ST3. A FIFO buffer comprising three elements is created in the program step S17. A program step S18, in which the limits, within which the metering quantity can be changed, i.e. a metering quantity $DM_{min}$ and a metering quantity $DM_{max}$ are determined, is effected subsequently to the program step S17. A metering quantity change factor DMF is determined in a program step S19 which is subsequent to the metering step S18. According to the invention, the metering quantity change factor is preferably DMF=2.

In a subsequent enquiry R13, it is enquired as to whether the metering quantity DM of the last three metering steps has reached the limits of the metering quantity which are determined in the program step S18. The metering quantity DM is set to the value $DM_{min}$ in a program step 20 in the case of a result Y (yes) of the enquiry R13. An enquiry R14 is subsequently carried out.

In the enquiry R14, one falls back on the gradient value DIR which is determined in the program step S11 of the fine setting B, and it is enquired as to whether the gradient value DIR is negative. This enquiry R14 is also carried out directly after the enquiry R13 when the result of the enquiry R13 is N (no), i.e. when the metering quantity DM of the last three metering steps has not reached the limits of the metering quantity DM which are determined in program step S18. In the case of a result Y (yes) of the enquiry R14, one returns again to the enquiry R13, otherwise, i.e. with a result N (no) of the enquiry R14, the program step 21, in which the tendencies of the gradient values DIR (0 for a reducing gradient value and 1 for an increasing gradient value) are deposited in the FIFO buffer, is carried out.

An enquiry R15, in which it is enquired as to whether the FIFO buffer is full, thus comprises three values, follows the program step S21. If the result of the request R15 is N (no), the program is assumed anew with the request R13. A program step S22 follows given a result Y (yes) of the enquiry S22.

It is counted how often the tendency of the three gradient values DIR stored in the FIFO buffer (0 for a reducing gradient value and 1 for an increasing gradient value) has changed, in the program step S22.

An enquiry R16 is subsequent to the program step S22, in which enquiry it is enquired as to whether the tendency of the gradient value DIR has changed not once (result 0), has changed once (result 1) or has changed twice (result 2). If the result of the enquiry R16 is 0, then the program step S23 is carried out, whereas the program step S24 is carried out given a result 1 of the enquiry R16, and the programs step S25 carried out given a result 2 of the enquiry R16.

The metering quantity change value DMA which is used in the program step S16 of the fine setting B is determined in the program step S23, S24 and S25. Hereby, the metering quantity change value DMA with the program step S23 results by way of multiplying the preceding metering quantity DM by the metering quantity change factor DMF. The metering quantity change value DMA is retained with the program step 24, and with the program step S25 the metering quantity change value DMA results by way of dividing the preceding metering quantity DM by the metering quantity change factor DMF. The program for determining the metering quantity change value DMA is completed in program step S26.

Figure 2:
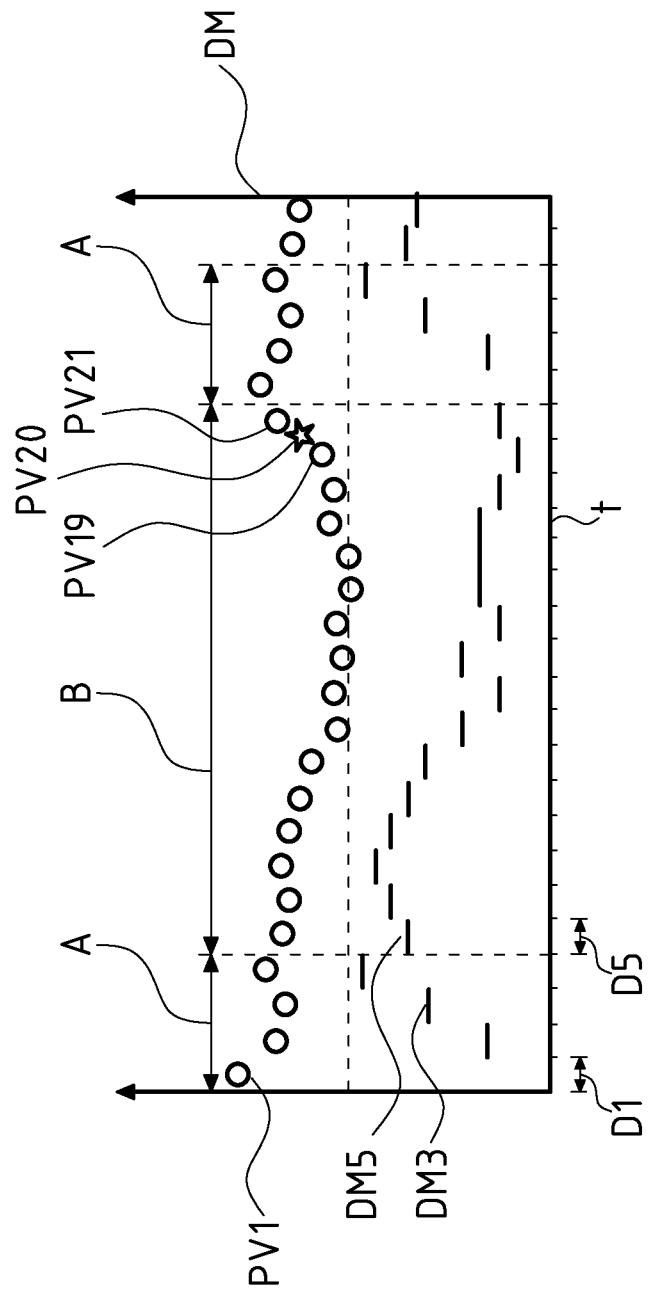
FIG. 2 is a function diagram representing the temporal development of a relation between a process variable of a filtering process and a metering quantity of a pre-treatment agent fed to the fluid to be filtered, the metering quantity being set on the basis of the values for the process variable.
Figure 3:
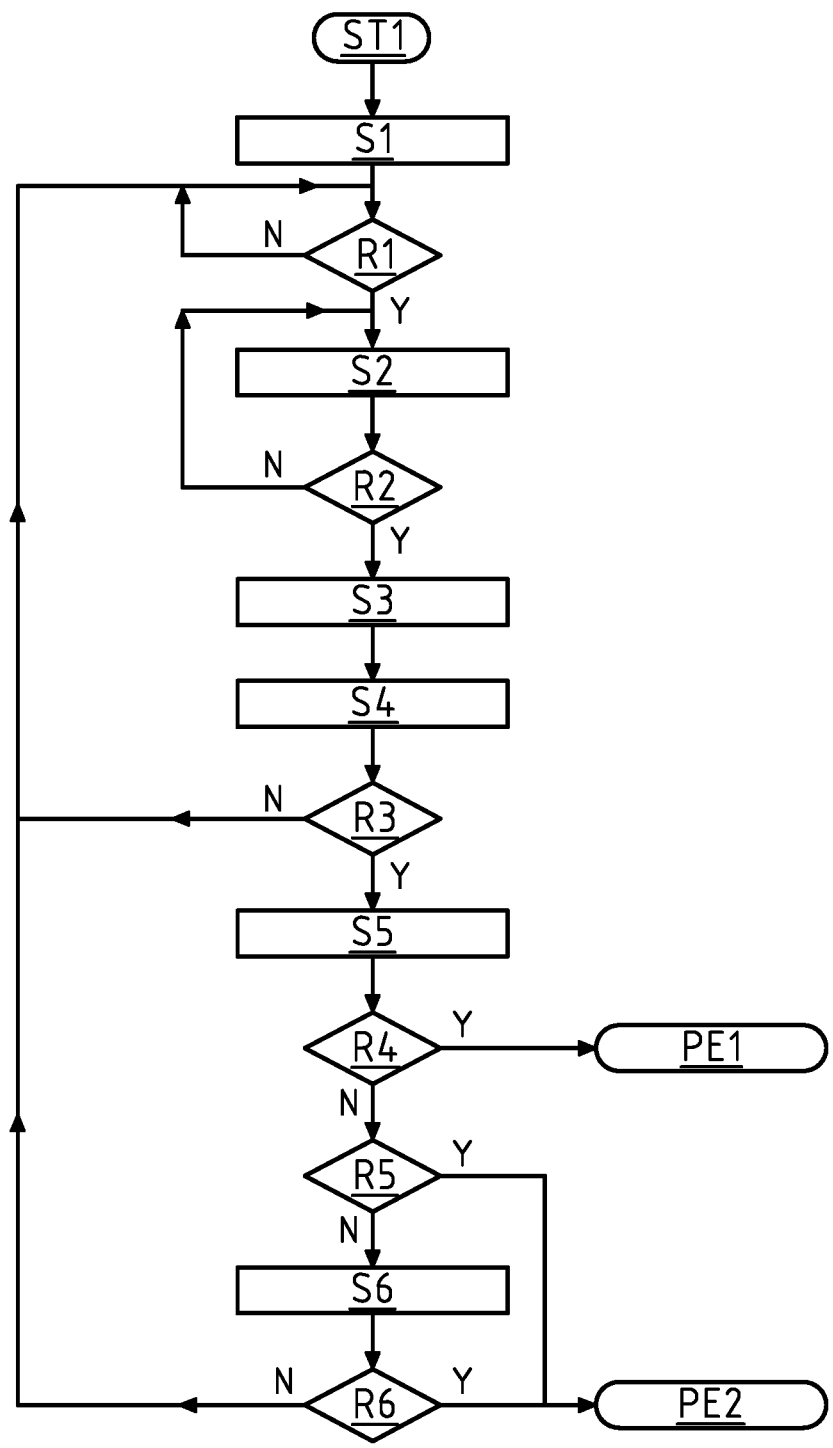
FIG. 3 is a flowchart for a coarse setting of the metering quantity of the pre-treatment agent.

It is evident from FIG. 2 that the fine setting B of the metering quantity DM is terminated when the magnitude of the process variables changes to a significant extent (see process variables PV19, PV20, PV21 in FIG. 2) with the fine setting, and a coarse setting A of the metering quantity DM is carried out anew, as described by way of the description of FIG. 3.

While specific embodiments of the invention have been shown and described in detail to illustrate the application of the principles of the invention, it will be understood that the invention may be embodied otherwise without departing from such principles.

APPENDIX

List of Reference Characters 2 filter unit
4 filter
6 conduit
8 pump
10 conduit
12 collection tank
14 exit conduit
16 conduit
18 pump
20 metering pump
22 pump part
24 drive
26 control
28 signal line 30 signal line
A coarse setting
B fine setting
D1 first metering step
DIR gradient value
DM metering quantity
DMA metering quantity change value
DMF metering quantity change factor
$DM_{max}$ maximal metering quantity
$DM_{min}$ minimal metering quantity
DM3 metering quantity
DM5 metering quantity
M number of filtering cycles per metering step
N result
PE1 program end
PE2 program end
PV1 process variable for the first metering step
R1 enquiry
R2 enquiry
R3 enquiry
R4 enquiry
R5 enquiry
R6 enquiry
R7 enquiry
R8 enquiry
R9 enquiry
R10 enquiry
R11 enquiry
R12 enquiry
R13 enquiry
R14 enquiry
R15 enquiry
R16 enquiry
S1 program step
S2 program step
S3 program step
S4 program step
S5 program step
S6 program step
S7 program step
S8 program step
S9 program step
S10 program step
S11 program step
S12 program step
S13 program step
S14 program step
S15 program step
S16 program step
S17 program step
S18 program step
S19 program step
S20 program step
S21 program step
S22 program step
S23 program step
S24 program step
S25 program step
ST1 start
ST2 start
ST3 start
Y result

What is claimed is:

1. A filtering method comprising:
leading a fluid to be filtered through a filter;
back-flushing the filter at predetermined intervals;
adding a pre-treatment agent to the fluid at an entry side of the filter;
continuously computing a process variable which describes efficiency of the filtration, during the filtration; and
adjusting a metering quantity of the pre-treatment agent in predetermined intervals on the basis of the values for the process variable or a characteristic value derived from the process variable, the filtering method being divided into several consecutive filtering cycles which, in each case, begins with a back-flushing of the filter and ends before the beginning of a next back-flushing, wherein a stored process variable is stored for each filtering cycle at a predetermined time of the filtering cycle, and a function curve of two or more stored process variables is determined from values of the stored process variables, the predetermined time of the filtering cycle comprising an end of the filtering cycle, wherein a gradient value of the function curve is determined for each metering step and the metering quantity is set based on the gradient value.

2. A filtering method according to claim 1, wherein the metering quantity is adjusted in metering steps which each comprise a certain number of filtering cycles.

3. A filtering method according to claim 1, wherein the process variable is a relative energy consumption per filtering cycle and which is computed by way of dividing a total energy consumption per filtering cycle by a net permeate volume produced per filtering cycle.

4. A filtering method according to claim 3, wherein the total energy consumption per filtering cycle is a sum of the energy necessary per filtering cycle, for the filtering, for the back-flushing and for the metering of the pre-treatment agent, as well as of an energy value representing an equivalent to the pre-treatment agent consumption.

5. A filtering method according to claim 3, wherein the net permeate volume which is produced per filtering cycle is the permeate volume produced per filtering cycle minus a permeate volume which is used per filtering cycle for back-flushing the filter.

6. A filtering method according to claim 1, wherein a coarse setting of the metering quantity is carried out in a first phase of the filtering process, and the metering quantity in a second phase of the filtering process is optimized in a fine setting, starting from a metering quantity determined with the coarse setting.

7. A filtering method according to claim 6, wherein the metering quantity with the coarse setting is increased by a same amount in consecutive metering steps, as long as the stored process variable changes in a same direction to a value representing an optimal process condition of the filtering process, wherein the coarse setting is finished when the stored process variable departs from the value representing the optimal process condition, in an opposite direction.

8. A filtering method according to claim 6, wherein:
the stored process variable is stored at the end of the filtering cycle, and a function curve of two or more stored process variables is determined from values of the stored process variables, wherein a gradient value of the function curve is determined for each metering step; and
the metering quantity with the fine setting of the metering is adjusted in each case in consecutive metering steps, wherein the metering quantity is changed or retained in dependence on the gradient value.

9. A filtering method according to claim 8, wherein:
the metering quantity is changed in a variable manner with the metering steps of the fine setting; and
the amount, by which the metering quantity is changed, is determined on the basis of the tendency of the gradient values in the directly preceding metering steps.

10. A filtering method according to claim 8, wherein the metering quantity is retained given a negative value of the gradient value.

11. A filtering method according to claim 6, wherein the fine setting of the metering quantity is completed given an abrupt change of the process variable and a renewed coarse setting of the metering quantity is carried out.

12. A filtering method according to claim 1, wherein the pre-treatment agent is added to the fluid to be filtered with a delay after a back-flushing of the filter.

13. A filtering method according to claim 1, wherein the start and the stop of the filtering cycle are determined by monitoring the continuously computed process variable or a process value measured in a filter device.

14. A filtering method according to claim 13, wherein a start of a filtering cycle is determined in case the continuously computed process variable or the measured process value decreases rapidly and that a stop of a filtering cycle is determined in case the continuously computed process variable or the measured process value increases rapidly.

15. The filtering method according to claim 1, wherein the process variable includes a pressure difference between an entry pressure at entry side of the filter and an exit pressure at the filter, wherein the pressure difference is continuously computed from a start of a filtering cycle to an end of the filtering cycle.

16. The filtering method according to claim 1, wherein the process variable includes a relative energy consumption, the relative energy consumption being continuously computed from a start of a filtering cycle to an end of the filtering cycle, the relative energy consumption comprising one or more of an energy consumption of a first pump, an energy consumption for back-flushing, an energy consumption of a second pump, an energy consumption for metering the pre-treatment agent, an energy consumption of a metering pump and a valve, wherein the one or more of the energy consumption of the first pump, the energy consumption for back-flushing, the energy consumption of the second pump, the energy consumption for metering the pre-treatment agent and the energy consumption of the metering pump and the valve is continuously computed from the start of the filtering cycle to the end of the filtering cycle.

17. A filtering method comprising:
leading a fluid to be filtered through a filter;
back-flushing the filter at predetermined intervals;
adding a pre-treatment agent to the fluid at an entry side of the filter;
continuously computing a process variable which describes efficiency of the filtration, during the filtration; and
adjusting a metering quantity of the pre-treatment agent in predetermined intervals based on the values for the process variable or a characteristic value derived from the process variable, the predetermined intervals being divided into consecutive filtering cycles, each of the consecutive filtering cycles starting with a back-flushing of the filter and ending before a start of a next back-flushing, wherein a stored process variable is stored for each filtering cycle at an end of one of the consecutive filtering cycles to provide a plurality of stored process variables, wherein the metering quantity of the pre-treatment agent is adjusted based on the plurality of the stored process variables sampled at the end of each of the filtering cycles.

18. The filtering method according to claim 17, wherein a function curve of two or more stored process variables is determined from values of the stored process variables, wherein a gradient value of the function curve is determined for each metering step and the metering quantity is set based on the gradient value.

* * * * *